Feb. 23, 1960  K. SITTEL  2,925,629
METHOD AND APPARATUS FOR PRODUCING FIBROUS STRUCTURES
Filed March 25, 1957  7 Sheets-Sheet 2

INVENTOR.
Karl Sittel,
BY Paul & Paul
ATTORNEYS

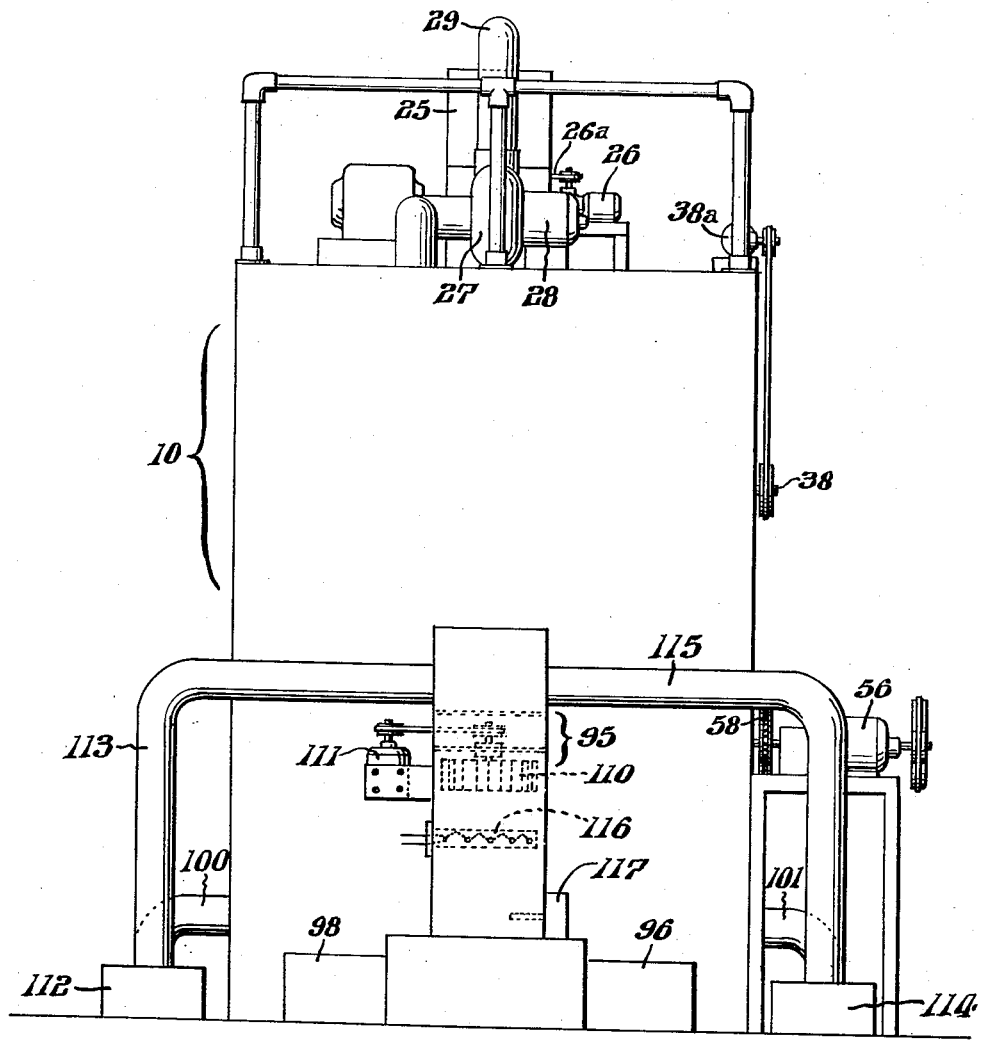

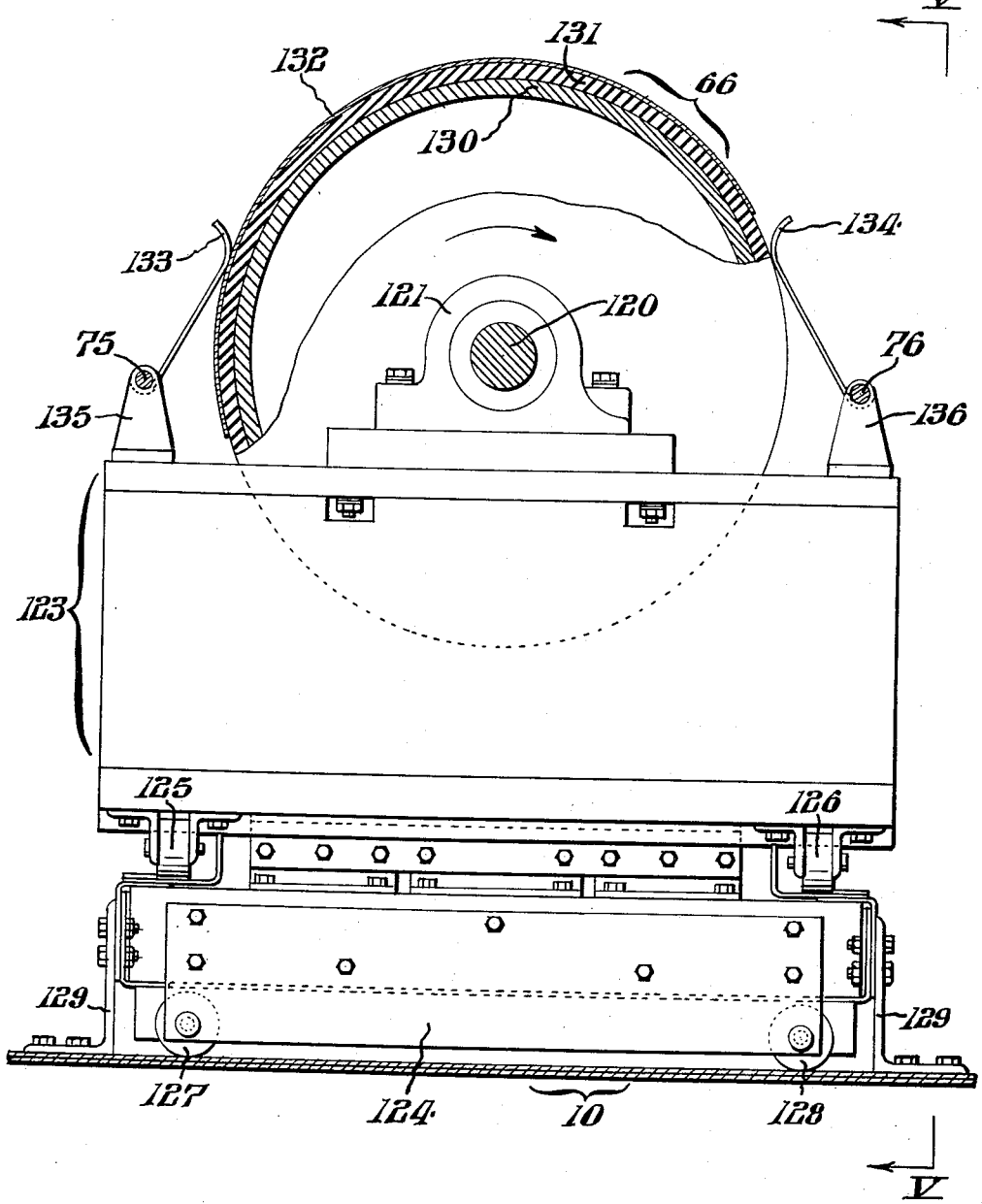

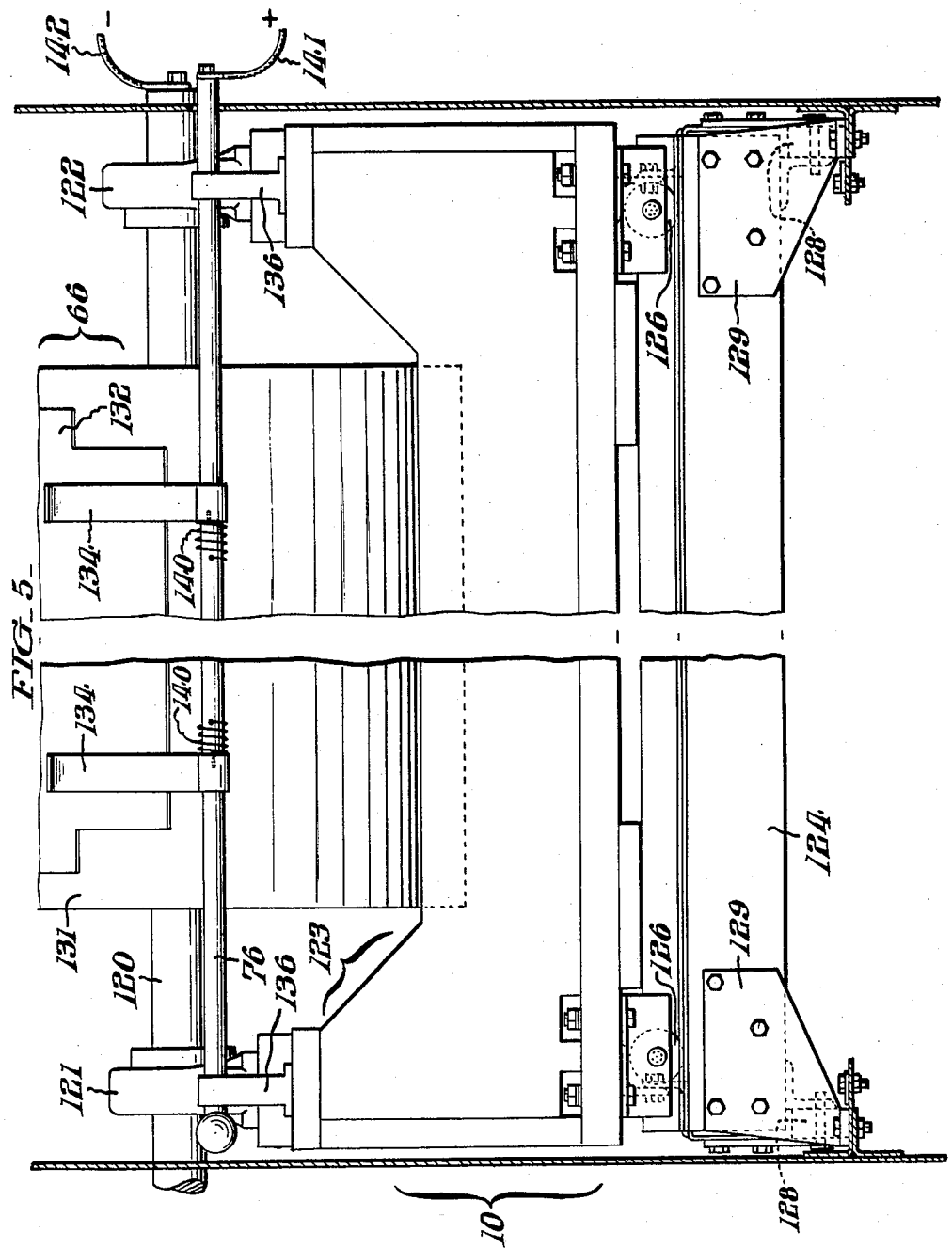

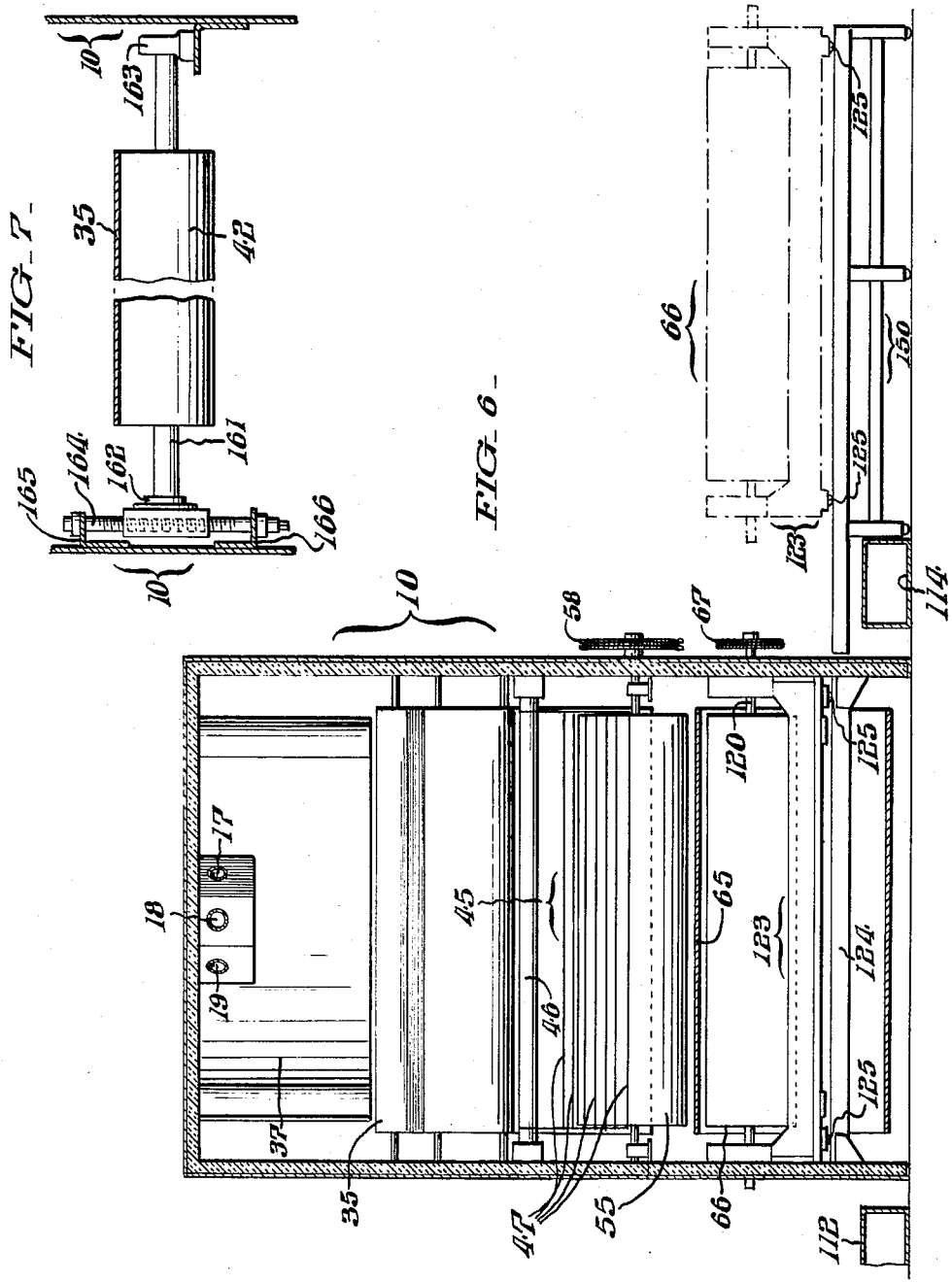

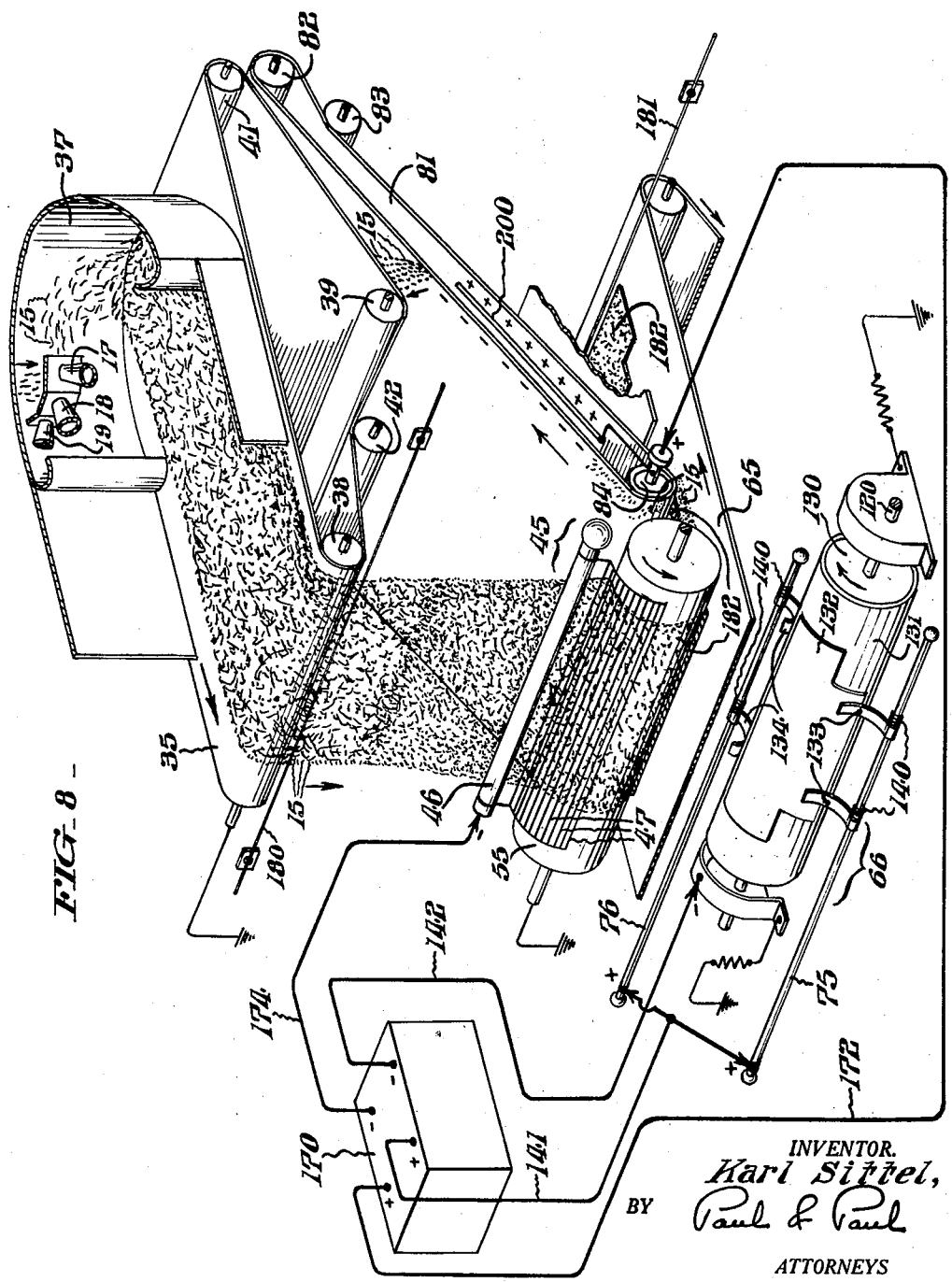

United States Patent Office 2,925,629
Patented Feb. 23, 1960

2,925,629

METHOD AND APPARATUS FOR PRODUCING FIBROUS STRUCTURES

Karl Sittel, Philadelphia, Pa., assignor to Walsco Company, a partnership consisting of Lessing J. Rosenwald, Jenkintown, Julius Rosenwald, Elkins Park, and Isadore M. Scott, Jenkintown, Pa.

Application March 25, 1957, Serial No. 648,336

11 Claims. (Cl. 19—144)

This invention relates to a method and apparatus for producing fibrous structures, and more specifically to a method and apparatus which utilizes electrostatic forces.

Fibrous products of different size and shape are presently manufactured. Of particular interest are products made of resin reinforced with glass fibers or rods such as Fiberglas. These products are satisfactory for some purposes and have a wide field of application. However, the processes by which they are produced include steps that are laborous, time consuming and uneconomical. Further, a number of obstacles must be eliminated before major progress can be made in the mass production of such fibrous articles. Accordingly, this invention relates to the uniform deposition of fibers on a support to form a coherent mat, such deposition being accomplished by the utilization of electrostatic forces. These fibers may be of any vegetable, animal, mineral or synthetic fibrous material. The fibrous mat may be bound by any suitable binding material of a sticky, adhesive, glutinous, tacky character, such as resin, or by a powdered, granular or other type of curable binder.

This invention relates to structures formed of cut glass fibers and method and apparatus for making them and is an improvement upon the inventions described in my co-pending applications Serial No. 476,733 filed December 21, 1954 and Serial No. 559,221 filed January 16, 1956.

In the formation of mats from glass fibers by electrostatic deposition, it has been found that the efficiency of the deposition is greatly reduced as the thickness of the mat is increased. The reduction in deposition efficiency is caused by the potential build-up on the deposited mat produced by the continuous influx of ionization current required to charge the fibers.

It is the purpose of the invention to provide a relatively heavy mat of glass fibers formed by electrostatic deposition.

It is a further object of the invention to provide a method and apparatus for depositing glass fibers in quantity in which the deposition efficiency is not seriously limited by the thickness of the mat deposited.

It is another object of the invention to provide a method and apparatus for making fibrous mats of glass fibers by electrostatic deposition in which the build-up of potential on the mat during deposition is minimized.

It is also an object of the invention to provide a continuous method of depositing glass fibers to form mats of predetermined shapes and sizes on flat and irregular or curved surfaces, and apparatus therefor.

It is a still further object of the invention to provide apparatus capable of carrying out the above objects which will function continuously in an efficient manner and which can be modulated or regulated to vary the shape, thickness, size and other characteristics of the structures produced.

Other objects and advantages of the invention will be apparent in the following description and in the drawings of which:

Fig. 3 is a front elevation of the apparatus of Figs. 1 and 2.

Fig. 4 is an enlarged front elevation of the pattern drum and supporting apparatus made according to the invention with parts broken out to better illustrate the invention.

Fig. 5 is a view taken as indicated by the line and arrows V—V in Fig. 4 of the apparatus;

Fig. 6 is a sectional view taken as indicated by the line and arrows VI—VI in Fig. 1, partly in dot dash illustrating the fiber depositing mechanism made according to the invention;

Fig. 7 is a sectional view taken as indicated by the lines and arrows VII—VII in Fig. 1.

Fig. 8 is a schematic diagrammatic view in perspective showing the operation of the apparatus shown in Figs. 1–7.

In my co-pending application, Serial No. 559,221, I described a method and apparatus for forming a mat from Fiberglas particles which are electrostatically charged and are collected on a rotating drum which dissipates the excess charge on the particles and deposits the particles on a moving belt in an area removed from the charging area. The same principle is applied in the present invention.

I have found that in producing fibrous structures by the aforesaid method it is desirable that the fibers be evenly distributed when deposited on the rotating drum and that the rotating drum be continuously cleaned of excess fiber throughout the operation of the mechanism.

Figure 1:
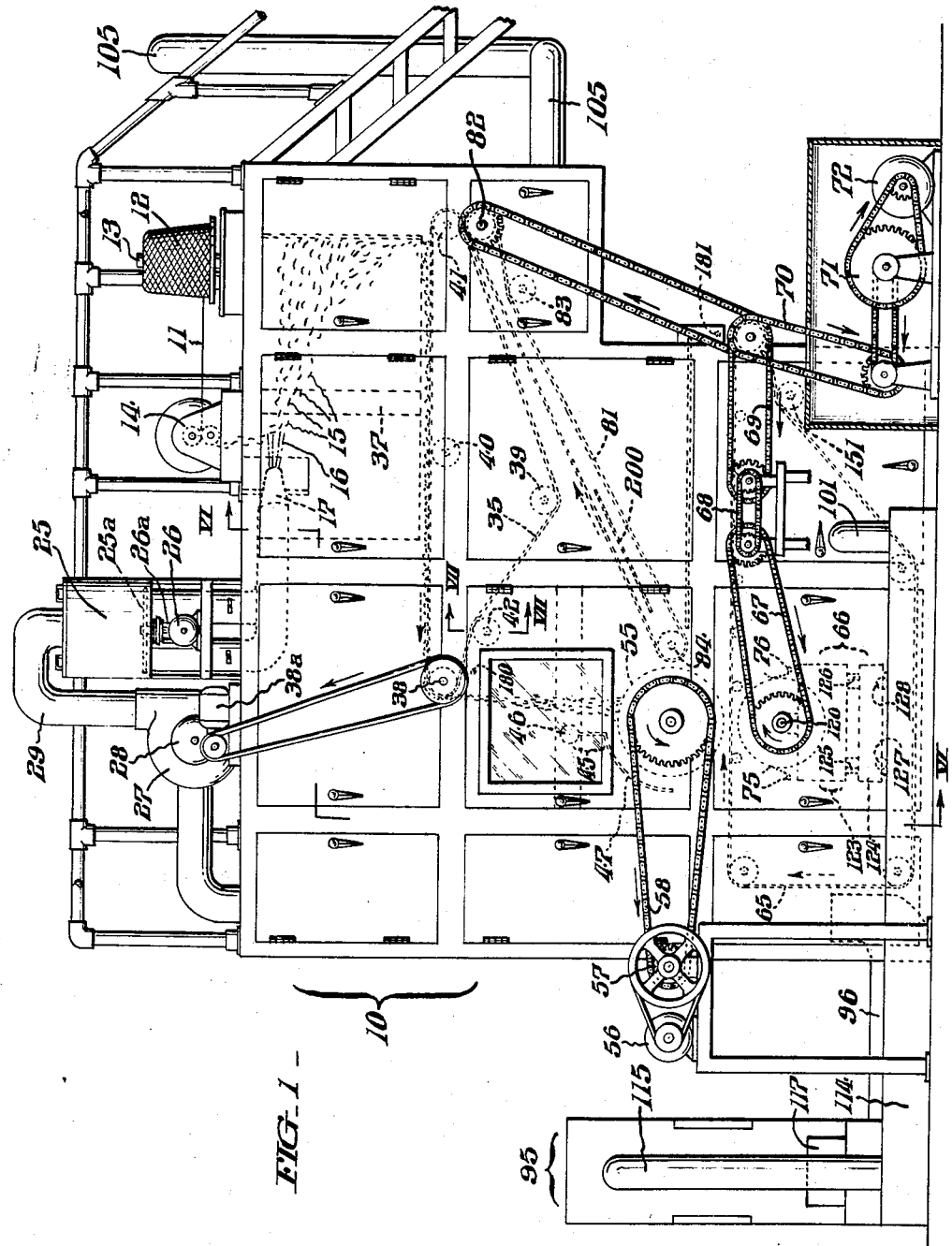
Fig. 1 is a side elevation of electrostatic Fiberglas depositing apparatus made in accordance wtih the invention.

The apparatus of the invention as illustrated in Fig. 1 comprises a structural frame 10 in which the working parts are housed. Fiberglas yarn 11 is fed from spool 12 on spindle 13 to cutter 14 in which the yarn 11 is continuously chopped. The cut fibers 15 fall by gravity into the air stream 16 produced by the nozzles 17, 18 and 19. The air supply comes to the nozzles 17, 18 and 19 through ducts initiating with air switch 25 which is driven by motor 26. The air supply is provided by fan 27 driven by motor 28 which feeds the air switch through duct 29. The air switch 25 includes a rotor 25a which is a disc covering the openings of nozzles 17, 18 and 19. Opening 25b is provided in rotor 25a and alternately opens nozzles 17, 18 and 19 to the air flow from duct 29 as rotor 25a rotates. Rotor 25a is driven by belt 26a connected to motor 26. By this means the air switch 25 serves to vary continuously the air flow at nozzles 17, 18 and 19 and in air stream 16.

The cut fibers 15 under the influence of the air blast 16 are dispersed in space and fall on the continuously rotating belt 35. The fibers 15 are dispersed in a band of uniform width which is maintained by the shield 37. The fibers 15 are carried along by the belt 35, in the direction indicated by the arrow, by drive roller 38 and drive motor 38a. The belt 35 is also mounted on idler rollers 39, 40, 41 and idler roller 42 which may be adjusted to vary the tension of the belt 35.

At the roller 38 the fibers fall through space past the charged electrode 45. Electrode 45 consists of a charged rod 46 and wires 47 which are electrically connected to rod 46. A predetermined potential is applied to the electrode 45 and the particles 15 are charged by the corona discharge occurring on the wires 47. The charged fibers are attracted to the collecting drum 55. This drum 55 is electrically grounded and continuously rotated by means of motor 56, speed changer 57 and chain drive 58. Due to the charge on the fibers 15 and the fact that the rotating drum 55 is grounded the fibers are attracted to the drum 55 and attach themselves to its surface.

Directly beneath the drum 55 is transfer belt 65 which is continuously moving in the same direction as the adjacent surface of the drum 55. Beneath this belt 65 is positioned the pattern drum 66. Pattern drum 66 is driven through chain drive 67, speed regulater 68 and chain drive 69 and 70, speed reducer 71 and motor 72. Regulator 68 may be employed to vary the relative rates of speed of the pattern drum 66 and belt 65. It will be apparent that the Fiberglas mat then produced may be shortened or lengthened by adjusting the speed regulator 68. Drum 66 has a metal pattern disposed about its surface which is charged electrostatically with a charge that is directly opposed to that of the charged fibers 15. The charge is applied to the metal pattern through electrodes 75 and 76.

Also adjacent drum 55 is a recovery belt 81 which is mounted on drive roller 82, tension roller 83 and idler roller 84. Idler roller 84 is provided with a charge that is opposite that of the charged particles 15. By virtue of the position of recovery belt 81 any particles remaining on the surface of drum 55 after it has passed over transfer belt 65 are removed by electrostatic attraction to belt 81 by which they are carried toward roll 82 where belt 81 approaches the distributing or delivery belt 35. Due to the ground potential of the conductive belt 35 the fibrous particles 15 are attracted to belt 35 and are thereafter carried into the distributing zone and ultimately to the point of entry into the charging electrode at roller 38. Shield 37 is spaced above belt 35 enabling the fibers on belt 35 to pass thereunder and return to be recirculated in the process.

The atmosphere in the apparatus 10 is controlled by humidifier 95 which delivers air at predetermined temperatures and humidity through ducts 96, 97 and 98 to the body of the structure 10. The air may be exhausted through ducts 105 and exhaust fan 106.

Figure 2:
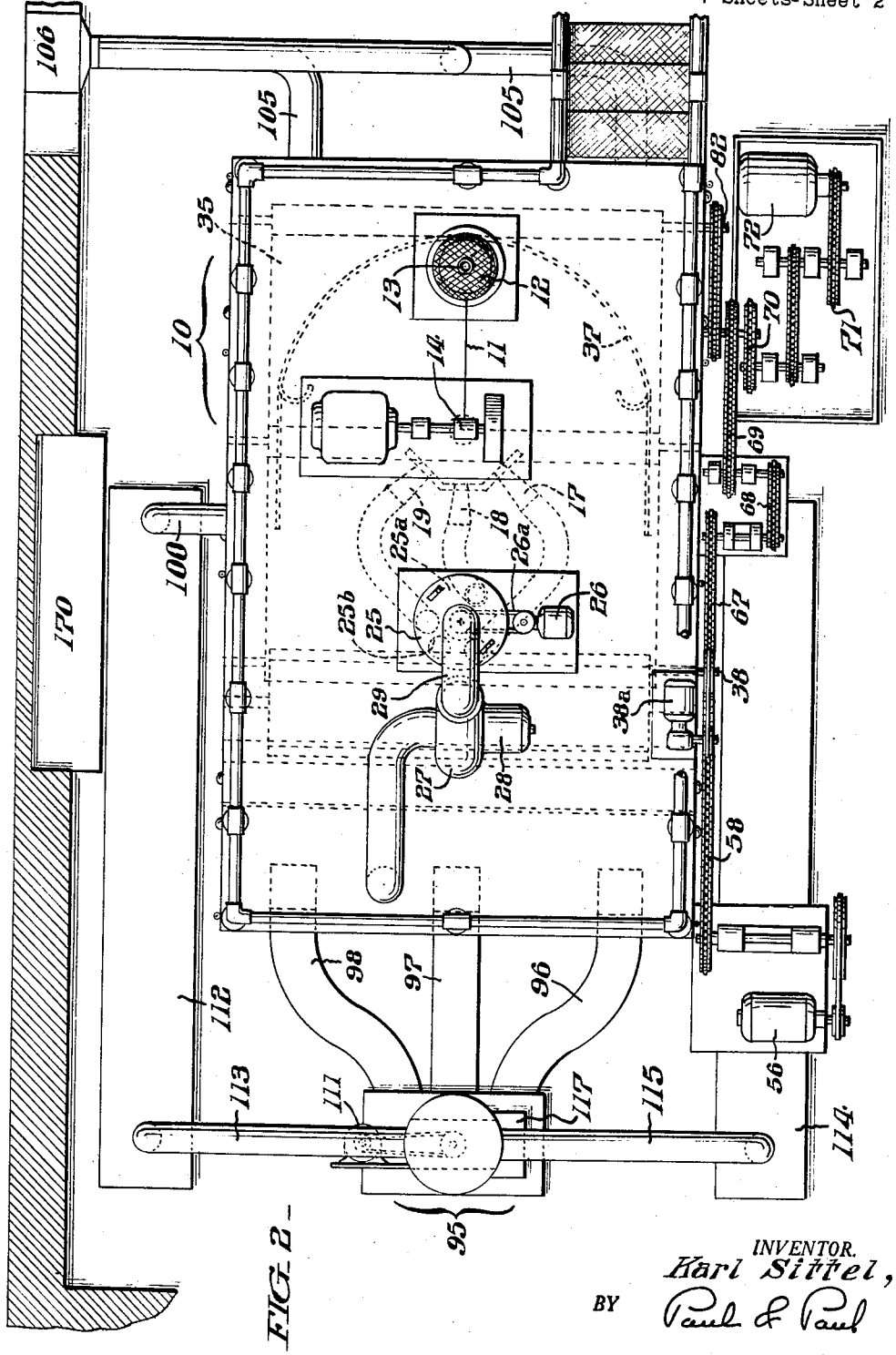
Fig. 2 is a plan view of the apparatus of Fig. 1.

In Fig. 3, which is a front elevation of the apparatus of Figs. 1 and 2, the humidifier 95 is shown in greater detail. In normal operation fan 110 driven by fan motor 111 draws the return air from the apparatus 10 through return ducts 100, 112 and 113 on one side and 101, 114 and 115 on the other. The return air is blown between fan 110 past heater 116 and humidifying elements 117 and then back into the structure 10 through inlets 96, 97 and 98.

Fig. 4 is an enlarged end view of pattern drum 66 and its supporting apparatus. The drum 66 is horizontally mounted on a transverse axle 120 which is in turn rotatably mounted on bearings 121 and 122. Bearings 121 and 122 are fixed to a wooden carriage 123 which is positioned on the dolly 124. Carriage 123 rests on rollers 125 and 126 by virtue of which it is enabled to roll transversely on the dolly 124. By this means the carriage may be easily removed from the structure 10 for replacement of the pattern 132. The dolly 124 is also mounted on rollers 127 and 128 which enable it to be moved laterally within the apparatus 10. It may be fixed in any position within structure 10 by means of bolted stops 129. Fig. 4 illustrates only one end of the pattern drum structure, the opposite end is similar in all respects.

The drum 66 comprises cylinder 130 which is of metal construction. The cylinder 130 is covered with an insulating material 131 and to the insulating material 131 is fitted the metallic pattern 132. It is this metallic pattern 132 which gives the form and shape to the fibrous structures which are produced on belt 65. The electrostatic charge is imparted from electrodes 75 and 76, to the pattern 132 through contact brushes 133 and 134 which are mounted on electrodes 75 and 76 which are in turn mounted on bearings 135 and 136 respectively. The electrodes 75 and 76 are connected to a high voltage electrical source. Fig. 5 shows essentially the same structure as Fig. 4 in side elevation. In addition it illustrates the springs 140 attached to the brushes 133 and 134 which serve to keep them against the pattern 132, lead wires 141 and 142 are also shown. Lead wire 141 places a positive charge at the brushes 133 and 134 and lead wire 142 carries a negative charge to the drum 66. Due to the negative charge of the insulated cover 131 of drum 66 the edges of the Fiberglas mat are clearly defined as the particles are deposited. The positive charge of the pattern 132 attracts the particles 15 in the form of the pattern 132 and while negative charges on the exposed drum surface 66 repels particles 15 from that area.

Fig. 6 is a sectional view of the fiber depositing apparatus including the structure 10. It illustrates particularly the vertical path of travel of the particles 15. The air stream 16 from the nozzles 17, 18 and 19 carries the fibers back against shield 37 so that they can drop on belt 35. They are dropped from belt 35 past the charged wires 47 to the depositing drum 55 from which they are transferred to belt 65. Pattern drum 66 is shown in dot dash in its position when removed on the carriage 123 from the frame structure 10. The carriage 123 is rolled on the wheels 125 and 126 to the supporting platform 150.

The adjustment roller 42 as illustrated in detail in Fig. 7 is the same for rollers 83 and 151. The roller 42 is mounted on shaft 161 which is rotatably mounted on bearings 162 and 163. Bearing 163 is fastened to the frame structure 10. Bearing 162 is threadably mounted on threaded rod 164 which is rotatably mounted on bearings 165 and 166. The bearings 165 and 166 are affixed to the structure 10. It will be apparent that the position of the roller 42 with respect to the structure 10 may be adjusted within limits by turning the threaded rod 164. By changing the position of the roll 42 the position of the associated belt 35 may be modified. This adjustability is desirable to prevent the belts from traveling laterally on their respective rollers.

A schematic wiring diagram for the apparatus made according to the invention is shown in Fig. 8. A power voltage source 170 is connected at its positive side through lead 141 to pattern brushes 133 and 134 and 75 which imparts a positive charge to the metallic pattern 132. Another lead 172 connects the positive side of the power source 170 to idler roller 84, which acquires a positive charge. The negative side of the power source 170 is connected through lead 142 to the axle 120 of pattern drum 66. Through the axle 120 the negative charge is transmitted to the metal drum 130. The negative side of the power source 170 is also connected through lead 174 to the corona wire electrode 47. The carriage 123 of pattern drum 66 is grounded as is the axle of collecting drum 55. The electrical arrangement described provides a positive charge at the metallic pattern 132 and negative charge on the fiber particles 15 so that the particles 15 will be strongly attached to the transfer belt 65 in the outline of the metallic pattern 132. A positive charge is also produced at idler roller 84 which is adjacent the collecting drum 55. This serves to remove any remaining negatively charged particles 15 which remain on the drum surface after passing the point of deposition on transfer belt 65. Residual electrostatic charges are dissipated by means of a 15,000 volt A.C. line 180 which passes directly beneath roller 38. This reduces any possible charge on the fiber particles 15 prior to their exposure to the corona wire electrode 47. Another 15,000 volt A.C. line 181 is passed over the finished pattern 182 thereby removing any charge buildup on the pattern 182. The charge applied to roller 84 may be extended in the direction of travel of the reclaimed fiber particles 15 by extending an electrode 200 beneath belt 81 in this direction.

In operation the Fiberglas yarn 11 is fed to the cutter 14 where it is chopped to form particles 15. These particles 15 fall by gravity into the modulated air stream 16 which distributes them against shield 37 across the width of belt 35. The evenly dispersed fibers are carried along belt 35 to roller 38 where the belt 35 reverses direction causing the particles to fall by gravity. At this point a wire 180 carrying alternating current is passed adjacent the falling fibers 15, the alternating current serves to remove any residual electrostatic charges on the fibers 15. The fibers 15 then fall past the negatively charged electrode 45 continuing in their travel under the force of gravity. The now negatively charged particles 15 fall on the grounded drum 55 which rotates at a predetermined speed. The negatively charged particles 15 are attracted to the grounded drum surface 55 and are carried by the drum in the direction of its rotation. Excess ionization current hitting the drum 55 is dissipated to ground. As the fibers 15 approach belt 65 they are attracted by the positive charge on pattern 132 which is continuously rotating on drum 130, beneath belt 65. The particles 15 thereby are distributed substantially in conformance with the shape of pattern 132 in continuous repetition along belt 65. In order to assure clear pattern definition of the fiber structure the drum 131 is negatively charged about the outline of pattern 132. Thus the particles 15 which are selected from drum 55 by the attracting force of pattern electrode 132 are subject to a repelling charge from the surface of drum 131 surrounding pattern electrode 132. This serves to direct all of the selected particles into the shape of the pattern 132 to form the fibrous article. Substantially all of the selected particles 15 thus are included in the article formed on belt 65. Theoretically all of the fibers on the surface of drum 55 are attracted to belt 65 by electrode 132. However in actual practice some of the particles 15 remain on the surface of drum 55. The selected fibers are those which are attracted toward belt 65 from drum 55 by pattern electrode 132. The mat 182 made up of particles 15 is carried away by belt 65. Any residual electrostatic charge remaining on mat 182 is removed by the alternating current passing through wire 181. As the drum 55 rotates with the charged particles 15 on its surface, some of the particles 15 will not be removed to belt 65, these remaining particles are removed from drum 55 by the positively charged roller 84 beneath belt 81. It is essential that the drum surface 55 be completely cleaned of particles 15. In actual operation a thin layer is maintained. The excess particles 15 are removed to belt 81 and are carried along by belt 81 in the direction indicated by the arrow in Fig. 8. Electrode 200 extends along the undersurface of belt 81. As the particles 15 approach the upper extremity of the electrode 200 and approach the surface of belt 38 they spontaneously jump from the surface of belt 81 to the undersurface of belt 35 as indicated in Fig. 8. They will then travel along belt 35 to the point of origin at shield 37.

It will be appreciated that many variations and equivalents may be employed in the specific embodiments of the disclosed invention, without departing from the spirit thereof as defined by the following claims.

Having thus described my invention, I claim:

1. A method of producing a fibrous structure comprising the steps of depositing fibers, which are electrostatically charged in one polarity, on an electrically grounded drum, transporting said fibers on the surface of said drum in the direction of drum rotation; attracting selected fibers away from said drum by subjecting them to an electrostatic charge of opposite polarity from a pattern electrode of predetermined shape, and repelling said selected fibers away from the area surrounding the perimeter of said electrode by subjecting them to an electrostatic charge of the same polarity; and transferring said selected fibers to a moving transfer belt to form a mat substantially corresponding in shape to the shape of said electrode.

2. A method of producing a fibrous structure comprising the steps of applying a negative electrostatic charge to a distributed mass of fibers; depositing the charged fibers on an electrically grounded drum; transporting the fibers on the surface of said drum in the direction of drum rotation; attracting selected fibers away from said drum by subjecting them to a positive electrostatic charge from a pattern electrode of predetermined shape, and repelling away from the area surrounding the perimeter of said electrode and within the area defined by said electrode said selected fibers by subjecting them to a negative electrostatic charge; and transferring said selected fibers to a moving transfer belt to form a mat substantially corresponding in shape to the shape of said electrode.

3. A method of producing a fibrous structure comprising the steps of directing a stream of air against a group of falling fibers to distribute them across a moving delivery belt; dropping the fibers off the end of said belt; applying a negative electrostatic charge to the fibers; depositing the charged fibers on an electrically grounded drum; transporting the fibers on the surface of said drum in the direction of drum rotation; attracting selected fibers away from said drum by subjecting them to a positive electrostatic charge from a pattern electrode of predetermined shape, and repelling said selected fibers toward said electrode by subjecting them to a negative electrostatic charge; and transferring said selected fibers to a moving transfer belt to form a mat substantially corresponding in shape to the shape of said electrode.

4. A method of producing a fibrous structure comprising the steps of cutting glass fiber yarn to form fibers; directing a stream of air against the fibers to distribute them across a moving delivery belt; transporting the distributed fibers to a predetermined location; dropping the fibers off the end of said belt; removing electrostatic charges from the fibers; applying an electrostatic charge of one polarity to the fibers; depositing the charged fibers on an electrically grounded drum; transporting the fibers on the surface of said drum in the direction of drum rotation; attracting selected fibers away from said drum by subjecting them to an electrode having an electrostatic charge of opposite polarity, and simultaneously repelling the selected fibers so that they move toward said electrode by subjecting them to an electrostatic charge of the same polarity; transferring said selected fibers to a moving transfer belt to form a mat of predetermined shape; removing electrostatic charges from said mat; attracting non-selected fibers from said drum by subjecting them to another electrostatic charge of opposite polarity, transferring said non-selected fibers from the drum to a moving recovery belt; and then transferring said non-selected fibers from said recovery belt to said delivery belt.

5. A method of producing a fibrous structure comprising the steps of cutting glass fiber yarn to form fibers; directing a stream of air against the fibers to distribute them across a moving delivery belt; transporting the distributed fibers to a predetermined location, dropping the fibers off the end of said belt; removing electrostatic charges from the fibers; then applying a negative electrostatic charge to the fibers; depositing the charged fibers on an electrically grounded drum; transporting the fibers on the surface of said drum in the direction of drum rotation; attracting selected fibers away from said drum by subjecting them to a positive electrostatic charge from a pattern electrode of predetermined shape, transferring said selected fibers to a moving transfer belt to form a mat of said predetermined shape; removing electrostatic charges from said mat; attracting non-selected fibers from the drum by subjecting them to another positive electrostatic charge; transferring said non-selected fibers from the drum to a moving recovery belt; and then transferring said non-selected fibers from said recovery belt to said delivery belt.

6. Apparatus for producing a fibrous structure comprising an electrically-grounded rotating drum on which is deposited fibers which are electrostatically charged in one polarity; attracting-electrostatic means of opposite polarity spaced from said drum for attracting selected fibers away from said drum; said attracting-electrostatic means including a rotating pattern electrode of varying width; repelling-electrostatic means of the same polarity as the fibers positioned laterally of said attracting-electrostatic means for repelling said selected fibers so that they move toward said attracting-electrostatic means; and a moving transfer belt positioned intermediate said drum and said attracting-electrostatic means for receiving said selected fibers to form thereon a mat of predetermined perimeter.

7. Apparatus for producing a fibrous structure comprising means for applying a negative electrostatic charge to a distributed mass of fibers; an electrically-grounded rotating first drum on which said fibers are deposited; a second rotating drum spaced from said first drum and having mounted thereon a first electrode of positive electrostatic charge for attracting fibers away from said first drum and a second electrode of negative electrostatic charge positioned beside said first electrode for repelling said attracted fibers toward said first electrode; and a moving transfer belt positioned intermediate said drums for receiving the fibers attracted toward said first electrode in the form of a mat of predetermined perimeter.

8. Apparatus for producing a fibrous structure comprising a moving delivery belt, means positioned above said delivery belt for directing a stream of air against a group of falling fibers to distribute them across said moving delivery belt; means applying a negative electrostatic charge to the fibers as they fall from the end of said delivery belt; an electrically-grounded rotating first drum positioned beneath the end of said delivery belt in the path of said fibers for receiving said fibers; a second rotating drum spaced from said first drum and having mounted thereon a first electrode of positive electrostatic charge for attracting fibers away from said first drum and a second electrode of negative electrostatic charge positioned beside said first electrode for repelling said attracted fibers toward said first electrode; and a moving transfer belt positioned intermediate said drums for receiving the attracted fibers in the form of a mat of predetermined perimeter.

9. Apparatus for producing a fibrous structure comprising means cutting glass fiber yarn to form fibers; a moving electrically-grounded delivery belt; means positioned above said delivery belt for directing a stream of air against the fibers to distribute them across said moving delivery belt; means removing electrostatic charges from the fibers as they fall from the end of said delivery belt; means applying an electrostatic charge of one polarity to the fibers; an electrically-grounded rotating first drum positioned beneath the end of said delivery belt in the path of said fibers for receiving said fibers; a second rotating drum spaced from said first drum and having mounted thereon a first electrode of opposite electrostatic charge from the fibers for attracting fibers away from said first drum and a second electrode of the same electrostatic charge as the fibers positioned beside said first electrode for repelling fibers toward said first electrode; a moving transfer belt positioned intermediate said drums for receiving fibers in the form of a mat of predetermined perimeter; means removing electrostatic charges from said mat; third electrode means of opposite polarity from the fibers remaining on said first drum for attracting the fibers from said first drum; a moving recovery belt positioned intermediate said first drum and said third electrode means for receiving fibers; the under side of said delivery belt being positioned above said recovery belt for receiving said fibers which are transferred from said recovery belt to said delivery belt.

10. Apparatus for producing a fibrous structure comprising means cutting glass fiber yarn to form fibers; a moving electrically-grounded delivery belt; means positioned above said delivery belt for directing a stream of air against the fibers to distribute them across said moving delivery belt; means removing electrostatic charges from the fibers as they fall from the end of said delivery belt; means applying a negative electrostatic charge to the fibers; an electrically-grounded rotating first drum positioned beneath the end of said delivery belt in the path of said fibers for receiving said fibers; a second rotating drum spaced from said first drum and having mounted thereon a first electrode of positive electrostatic charge for attracting fibers away from said first drum and a second electrode of negative electrostatic charge positioned beside said first electrode for repelling fibers toward said first electrode; a moving transfer belt positioned intermediate said drums for receiving fibers in the form of a mat of predetermined perimeter; means removing electrostatic charges from said mat; a third electrode of positive polarity for attracting fibers remaining on said first drum from said first drum; a moving recovery belt positioned intermediate said first drum and said third electrode for receiving said fibers; the under side of said delivery belt being positioned above and in proximity to said recovery belt for receiving said fibers from said recovery belt.

11. Apparatus for forming fibrous articles comprising means for producing substantially evenly distributed fiber particles; means for electrostatically charging said particles; feed belt means for delivering said fiber particles to said charging means; rotating drum means for receiving said charged particles and carrying them circumferentially about the axis of said drum; a second rotating drum axially parallel to said first drum and spaced therefrom; a patterned electrode disposed about the surface of said second drum for attracting said fiber particles from the surface of the first drum; endless belt means disposed between said first and second drums and moving in the same direction as the adjacent surfaces of said drums; and means for varying the speed of rotation of said second drum.

References Cited in the file of this patent

UNITED STATES PATENTS

| 668,792 | Blake et al. | Feb. 26, 1901 |
|---|---|---|
| 760,494 | Sory | May 24, 1904 |
| 884,157 | Hollingsworth | Apr. 7, 1908 |
| 1,510,252 | Wilhelm | Sept. 30, 1924 |
| 2,048,651 | Norton | July 21, 1936 |
| 2,231,324 | Crompton | Feb. 11, 1941 |
| 2,357,658 | Johnson et al. | Sept. 5, 1944 |
| 2,462,487 | Griffith et al. | Feb. 22, 1949 |
| 2,702,261 | Bacon et al. | Feb. 15, 1955 |
| 2,719,336 | Stotler | Oct. 4, 1955 |

FOREIGN PATENTS

| 1,124,895 | France | July 2, 1956 |